(12) United States Patent
Khan

(10) Patent No.: US 11,167,237 B2
(45) Date of Patent: Nov. 9, 2021

(54) AIR/OIL SEPARATOR

(71) Applicant: Dekker Vacuum Technologies, Inc., Michigan City, IN (US)

(72) Inventor: Sajid Ali Khan, Chesterton, IN (US)

(73) Assignee: Dekker Vacuum Technologies, Inc., Michigan City, IN (US)

( * ) Notice: Subject to any disclaimer, the term of this patent is extended or adjusted under 35 U.S.C. 154(b) by 132 days.

(21) Appl. No.: 16/514,300

(22) Filed: Jul. 17, 2019

(65) Prior Publication Data

US 2021/0016217 A1  Jan. 21, 2021

(51) Int. Cl.
*B01D 50/00* (2006.01)
*B01D 45/08* (2006.01)
*F04C 19/00* (2006.01)
*B01D 46/00* (2006.01)
*B01D 19/00* (2006.01)

(52) U.S. Cl.
CPC .......... *B01D 50/002* (2013.01); *B01D 45/08* (2013.01); *B01D 46/0031* (2013.01); *B01D 46/0043* (2013.01); *F04C 19/004* (2013.01); *B01D 19/0042* (2013.01); *B01D 19/0047* (2013.01)

(58) Field of Classification Search
CPC .. B01D 50/002; B01D 45/08; B01D 46/0043; B01D 46/0031; B01D 19/0042; B01D 19/0047; F04C 19/004
See application file for complete search history.

(56) References Cited

U.S. PATENT DOCUMENTS

| | | | | |
|---|---|---|---|---|
| 2,868,315 A | * | 1/1959 | Chaple | B01D 19/0042 96/190 |
| 2,960,234 A | * | 11/1960 | Fredrickson | C10G 33/06 210/457 |
| 3,212,232 A | * | 10/1965 | McMinn | B01D 19/0057 95/243 |
| 3,255,574 A | * | 6/1966 | Glasgow | B01D 17/042 95/252 |
| 3,654,748 A | * | 4/1972 | Bloom | B01D 19/0057 55/322 |
| 4,359,329 A | * | 11/1982 | Willeitner | F25B 43/02 55/320 |
| 4,666,473 A | * | 5/1987 | Gerdau | B01D 45/08 184/6.16 |

(Continued)

*Primary Examiner* — Dung H Bui
(74) *Attorney, Agent, or Firm* — Crump Law P.C.

(57) ABSTRACT

The air/oil separator uses a multi-chambered reservoir tank, which is divided into four separate internal chambers. The discharge oil passes sequentially through the chambers within the separator progressively separating and collecting the liquid oil from the discharge. The separator has an elongated reservoir chamber and three additional chambers, a deflector chamber, a screen chamber and a filter chamber located over the reservoir chamber. The separator includes two removable diffuser plates suspended within the reservoir chamber. The separator includes a replaceable screen separating the reservoir and screen chambers and filter element mounted within the filter chamber. Discharged oil enters the separator through a side oriented inlet port into the deflector chamber. The discharge oil is directed against an internal deflector wall within the deflector chamber that redirects the flow radially before falling vertically into the main reservoir chamber below.

25 Claims, 12 Drawing Sheets

(56) References Cited

U.S. PATENT DOCUMENTS

| | | | | |
|---|---|---|---|---|
| 4,692,175 A | * | 9/1987 | Frantz | B01D 29/23 96/408 |
| 4,788,825 A | * | 12/1988 | Calupca | B01D 46/12 55/321 |
| 5,154,742 A | * | 10/1992 | Gault | B01D 45/08 55/315.2 |
| 5,214,937 A | * | 6/1993 | Henrichs | B01D 50/002 62/468 |
| 5,494,501 A | * | 2/1996 | Anspach | B01D 45/14 55/330 |
| 5,919,284 A | * | 7/1999 | Perry, Jr. | B01D 45/02 55/319 |
| 6,033,462 A | | 3/2000 | Dekker et al. | |
| 10,710,013 B2 | * | 7/2020 | Mueller | B04C 3/06 |
| 2009/0282985 A1 | * | 11/2009 | Whiteley | B01D 19/0031 96/189 |

* cited by examiner

AIR/OIL SEPARATOR

This invention relates to air/oil separators used in closed loop oil seal systems for liquid ring vacuum pumps, and specifically an air/oil separator which incorporates a multi-chambered design for facilitating multiple stages of oil particulate separation.

BACKGROUND OF THE INVENTION

Vacuum pumps are used to create vacuum pressure for a variety of industrial applications. Most vacuum pump designs require internal lubrication; however, liquid ring vacuum pumps require no internal lubrication because there is no metal to metal contact between the rotating and stationary parts of the pump and the bearings are located external to the pumping chamber. The design of liquid ring vacuum pumps uses a multi-bladed impeller mounted on a shaft positioned eccentrically in a cylindrical pump housing. The pump housing is partially filled with a liquid sealant. Plates with inlet and discharge openings are positioned on either side of the impeller. As the impeller rotates, the centrifugal force pushes the liquid sealant outward forming a liquid ring within the pump housing. Owing to the eccentricity of the impeller to the housing, a crescent shaped space develops between the impeller hub and liquid ring and when impeller rotates, increasing and decreasing volumes divided by the impeller blades creates vacuum. The design of the liquid ring vacuum pump requires a continuous flow of fresh sealing liquid in the pump housing.

Liquid ring vacuum pumps typical use water as the sealing medium; however, the use of water has several drawbacks. In an open system, vacuum pumps can draw and discharge a continuous supply of fresh water from an external source. Environmental laws, restrictions on water usage, and the cost of water discharge disposal creates a need for a closed loop seal system, which recirculates the water. Recirculated water often picks up contaminants that can damage the pump. In addition, the water is heated in the operation of a liquid ring vacuum pump and must be cool before being recirculated back into the pump in a closed loop seal system. This necessitates the use of a heat exchanger in the seal system.

Water-less liquid ring vacuum pumps have been developed that use oil as the sealant. The use of oil as the sealant medium has several operational advantages over water, but it necessitates the use of a closed loop oil seal system. The operation of waterless liquid ring vacuum pumps, however, creates a significant oil separation problem for their oil seal systems. The rotation of the impeller inside the pump creates oil mist, which is a mixture of air and gaseous oil particulate. The oil mist is circulated through the closed loop oil seal system along with the oil discharge. Unlike oil mist, the water vapor created by the rotation of the impeller in a water based system can be simply vented into the atmosphere without significantly affecting the environment or the oil seal system. Consequently, oil seal systems for waterless liquid ring vacuum pumps must include air/oil separators, which separate the oil particulate contained in the oil mist from the air. The recaptured oil separated from the oil mist must be collected for re-circulation, while the air is vented out of the system.

Conventional air/oil separators have comprised simply a reservoir tank and a separate filter element. The reservoir tank collects the liquid oil from the oil discharge deposited into the separator from the vacuum pump, while the filter element collects the gaseous oil particulate from the oil mist in the oil discharge. Conventional filter elements use an oil absorbing composite fiber-glass mesh, in which the oil particulate coalesces. This type of air/oil separator often fails to remove a significant portion of the oil particulate from the oil mist. The failure is often due to the velocity of the oil discharge through the separator, and the shear volume of oil discharge deposited into the separators. The oil mist often passes through the separator too quickly to permit sufficient condensation within the reservoir tank and too quickly to coalesce an acceptable portion of the oil particulate within the filter element.

SUMMARY OF THE INVENTION

The air/oil separator of this invention uses a multi-chambered reservoir tank, which is divided into four separate internal chambers. The discharge oil passes sequentially through the chambers within the separator progressively separating and collecting the liquid oil from the discharge. The separator has an elongated reservoir chamber and three additional chambers, a deflector chamber, a screen chamber and a filter chamber located over the reservoir chamber. Discharged oil enters the separator through a side oriented inlet port into the deflector chamber. The discharge oil is directed against an internal deflector wall within the deflector chamber that redirects the flow radially before falling vertically into the main reservoir chamber below. Redirecting the flow of oil discharge within the deflector chamber slows and cools the discharge oil, which helps minimize oil mist.

The separator also includes two removable diffuser plates suspended within the reservoir chamber. The separator includes a replaceable screen separating the reservoir and screen chambers and filter element. The diffuser plates restrict and slow the flow of liquid oil and oil mist within the reservoir chamber and serves as a structure upon which oil particulate may coalesce and collect. The oil screen prevents liquid oil from splashing upward into the screen chamber while allowing oil mist to rise through the screen from the reservoir chamber into the screen chamber. The oil screen also captures oil particulate from the oil mist before entering the screen chamber. Oil mist is drawn through the screen chamber into the filter chamber. The replaceable filter element mounted within the filter chamber removes the remaining oil particulate contained in the oil mist before exhausted from the separator.

The multi-chambered design of the separator creates multiple stages of oil separation within the separator. The separator also uses gravity and multiple direction changes of fluid flow through the various internal chambers of the separator to slow the flow rate of the liquid oil and oil mist, which all contributes to improved oil separation. The oil discharge travels the entire length of the separator and back before venting air fully separated from the discharge oil. Locating the screen chamber and filter chamber over the main reservoir chamber allows gravity to help separate oil particulate from the oil mist. In addition, the separator employs a side-by-side design and a side oriented inlet port, which orients the separator along side of conventional pump/motor/exchanger assembly for a reduced the overall foot print of the separator.

The above described features and advantages, as well as others, will become more readily apparent to those of ordinary skill in the art by reference to the following detailed description and accompanying drawings.

BRIEF DESCRIPTION OF THE DRAWINGS

The present invention may take form in various system and method components and arrangement of system and method components. The drawings are only for purposes of illustrating exemplary embodiments and are not to be construed as limiting the invention. The drawings illustrate the present invention, in which.

DESCRIPTION OF THE PREFERRED EMBODIMENT

Figure 1:
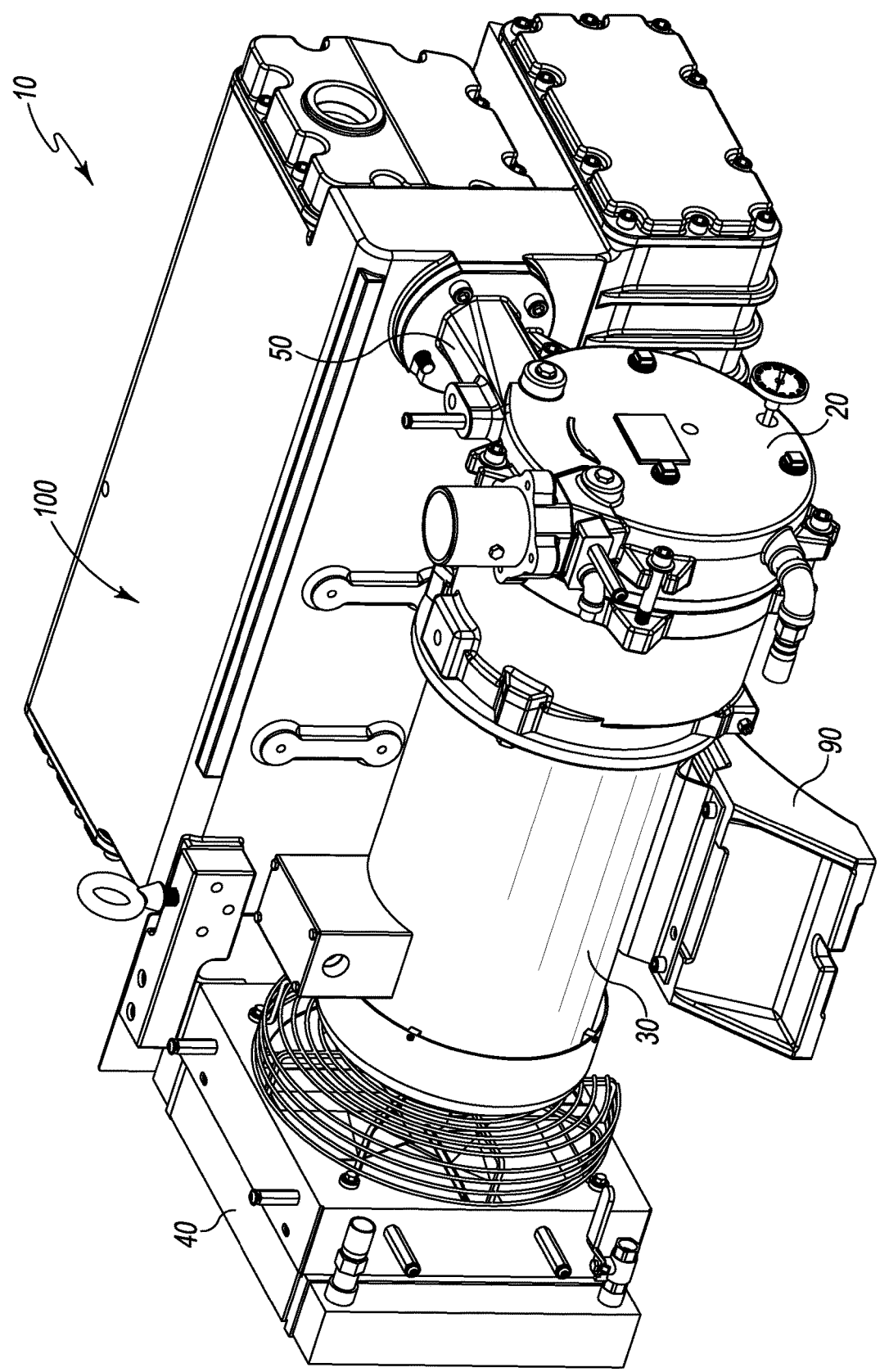
FIG. 1 is a front perspective view of a conventional sealed oil system using an exemplary embodiment of the air/oil separator of this invention.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical, structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Referring now to the drawings, FIGS. 1-11 illustrate an exemplary embodiment of the air/oil separator of this invention, which is designated generally as reference numeral 100. Separator 100 is used as part of a closed-loop, sealed oil vacuum pump system 10 for water-less liquid ring vacuum pumps, such as the type manufactured and distributed by Dekker Vacuum Technologies, Inc. of Michigan City, Ind. Although illustrated in use with a liquid ring vacuum pump system, separator 100 can be used with any sealed-oil pump system regardless of its application. The general design, construction and operation of closed-looped, sealed oil pump systems are common and well known in the art.

As shown, system 10 includes a vacuum pump 20, drive motor 30, heat exchanger 40 and separator 100. Separator 100 separates and collects the liquid and gaseous oil discharge that is exhausted from pump 20 for re-circulation through heat exchanger 40 and back into the pump. An inlet line 50 connects pump 20 to separator 100, which delivers oil discharge and oil mist from the pump into the separator. A return line 60 connects separator 100 to heat exchanger 40. A return line (not shown) from heat exchanger 40 returns oil back to pump 20. An additional salvage line 70 is connected between separator 100 and pump 20. System 10 also includes a variety other lines, valves, gauges and controls, which are commonly incorporated into such systems and well known in the art.

Figure 2:
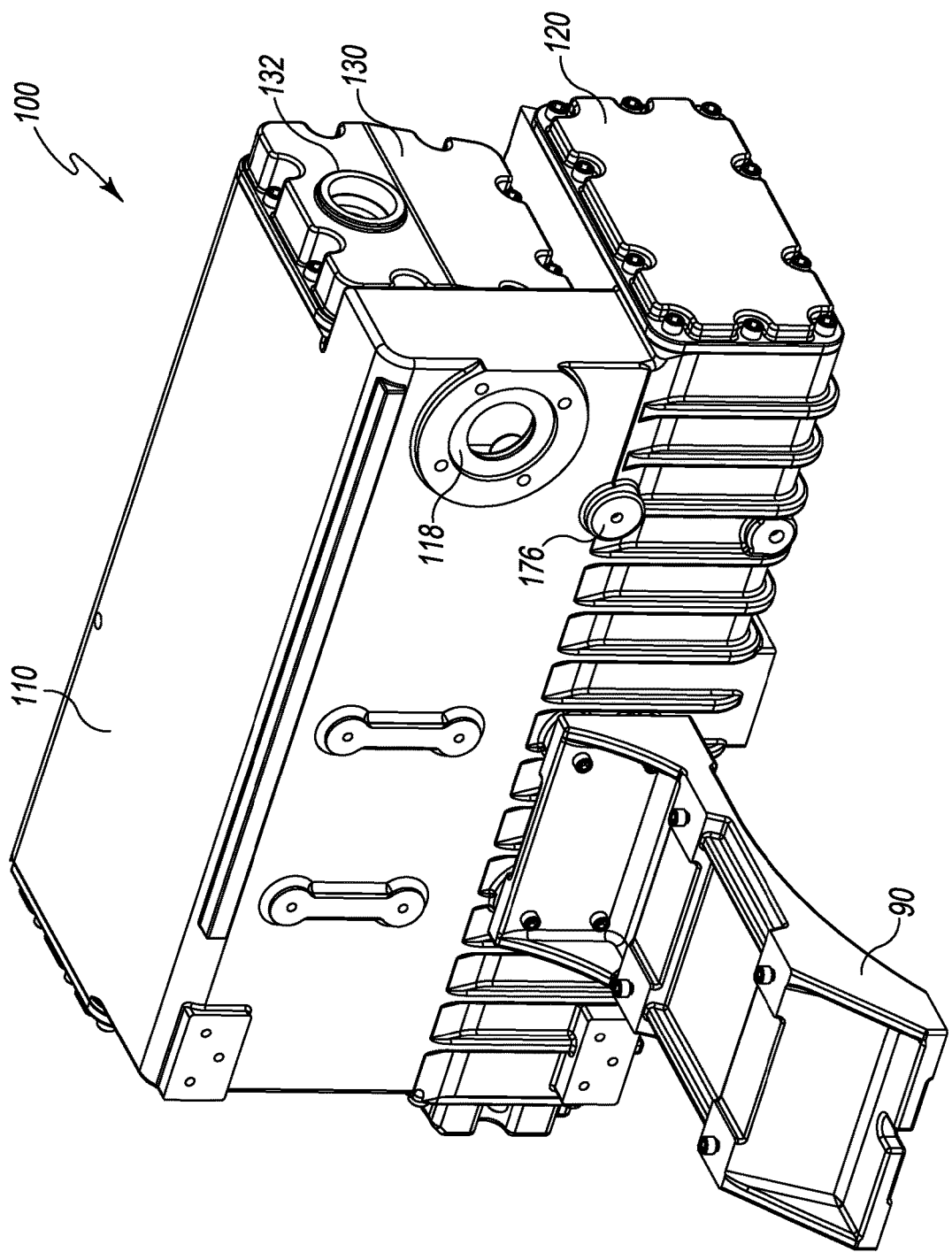
FIG. 2 is a front perspective view of the air/oil separator and support base of FIG. 1.
Figure 3:
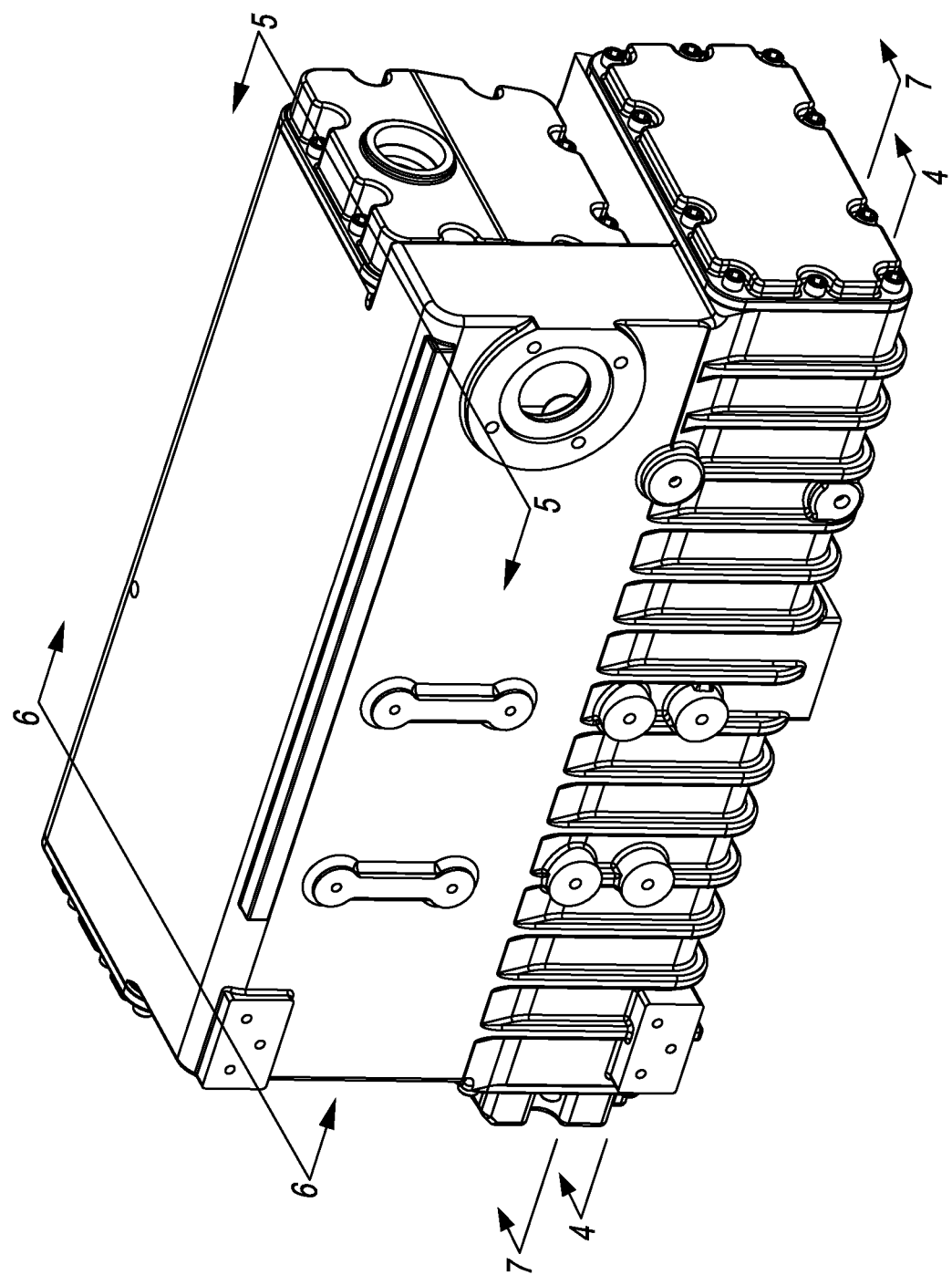
FIG. 3 is a front perspective view of the air/oil separator of FIG. 1.
Figure 4:
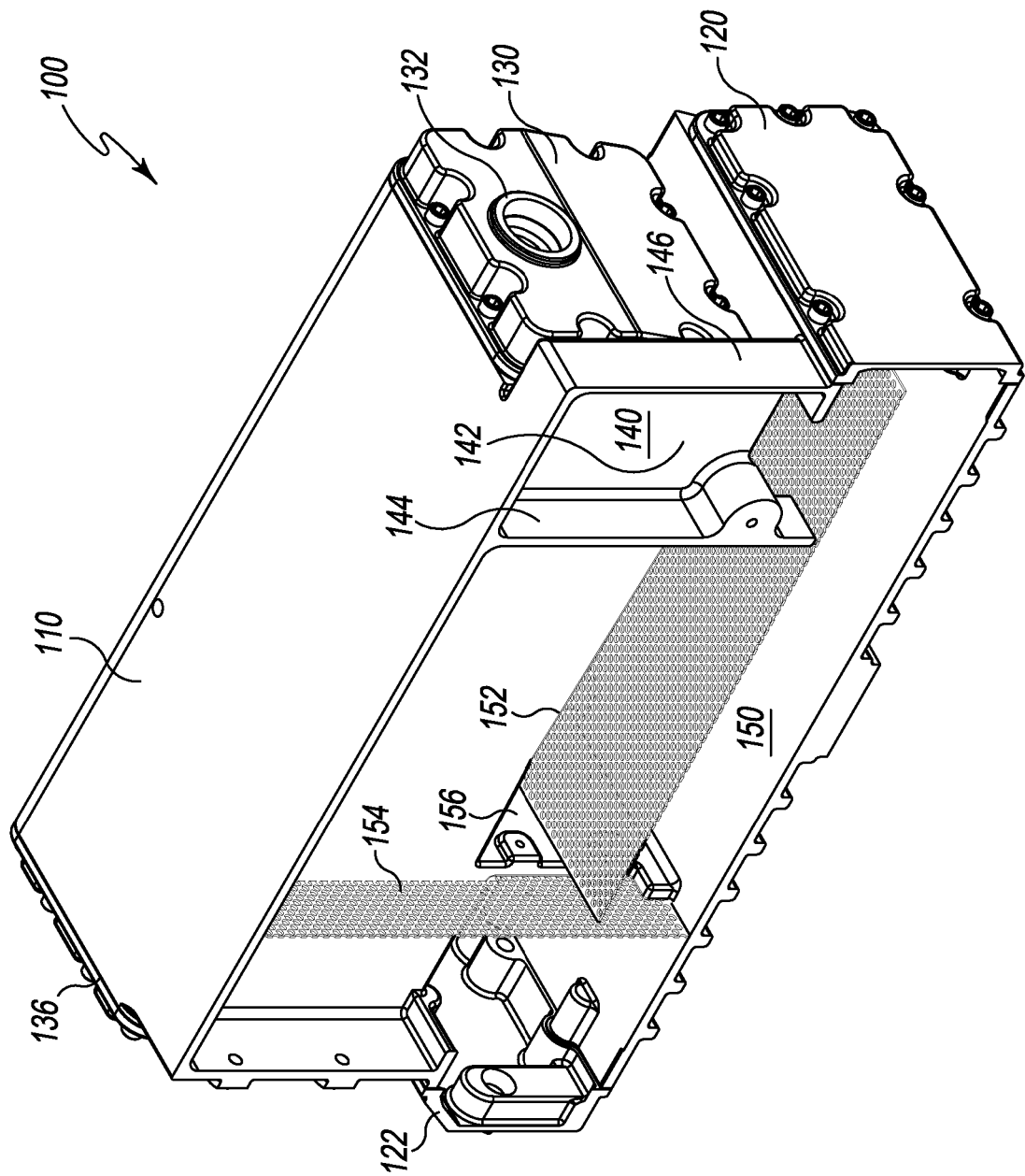
FIG. 4 is a sectioned perspective view of the air/oil separator taken along lines 6-6 of FIG. 3.
Figure 5:
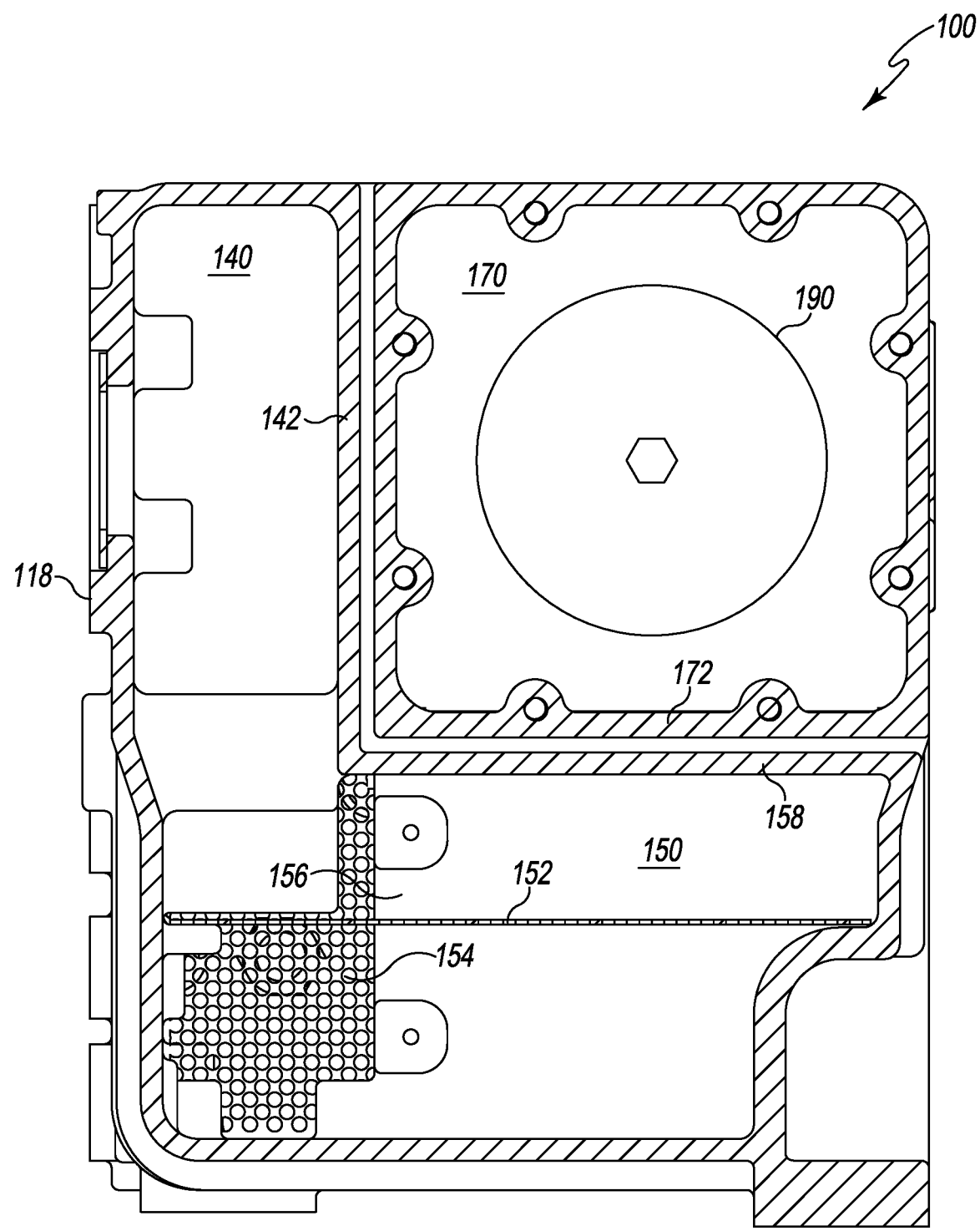
FIG. 5 is an end sectional view of the air/oil separator taken along lines 4-4 of FIG. 3.
Figure 6:
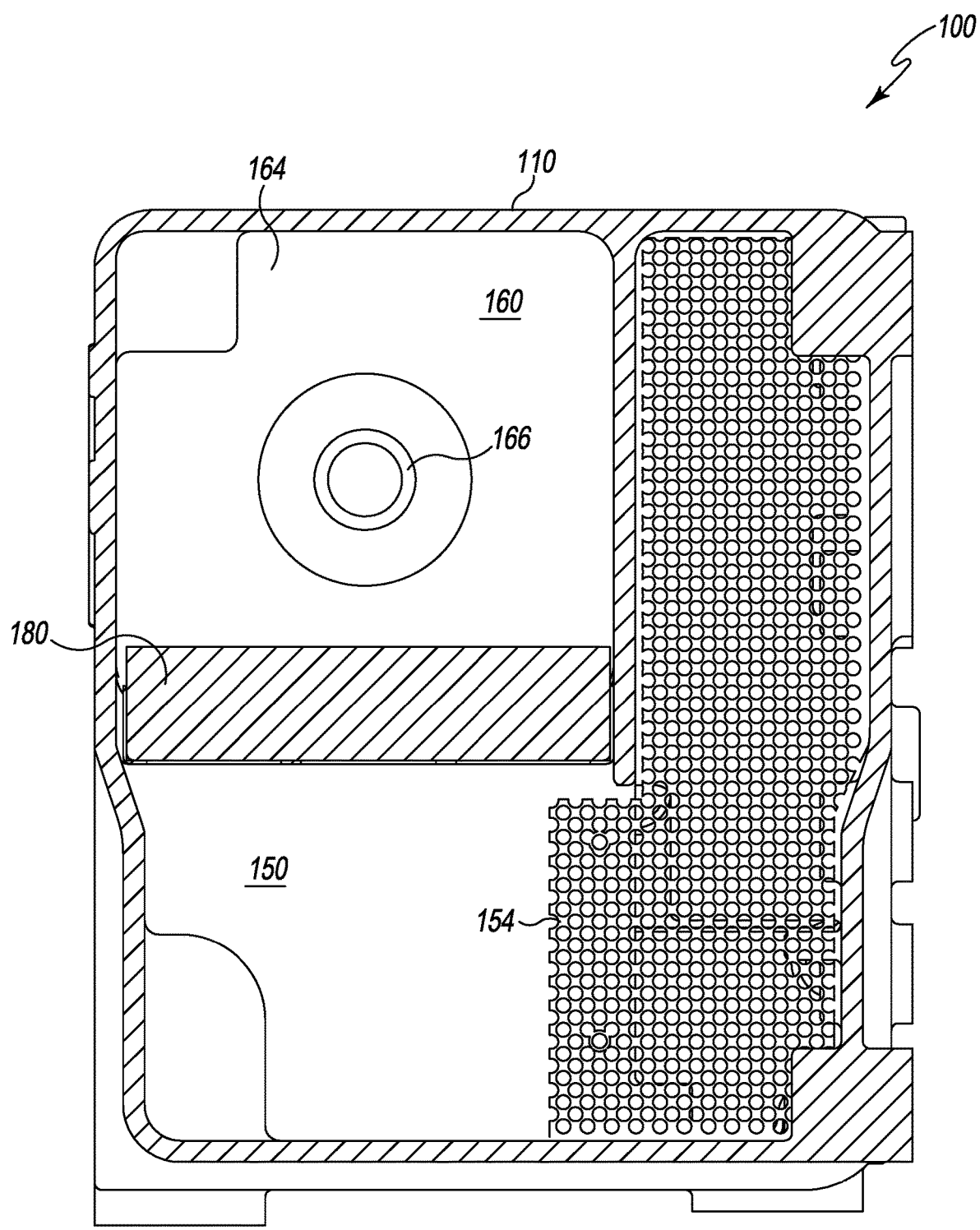
FIG. 6 is an end sectional view of the air/oil separator taken along lines 5-5 of FIG. 3.
Figure 7:
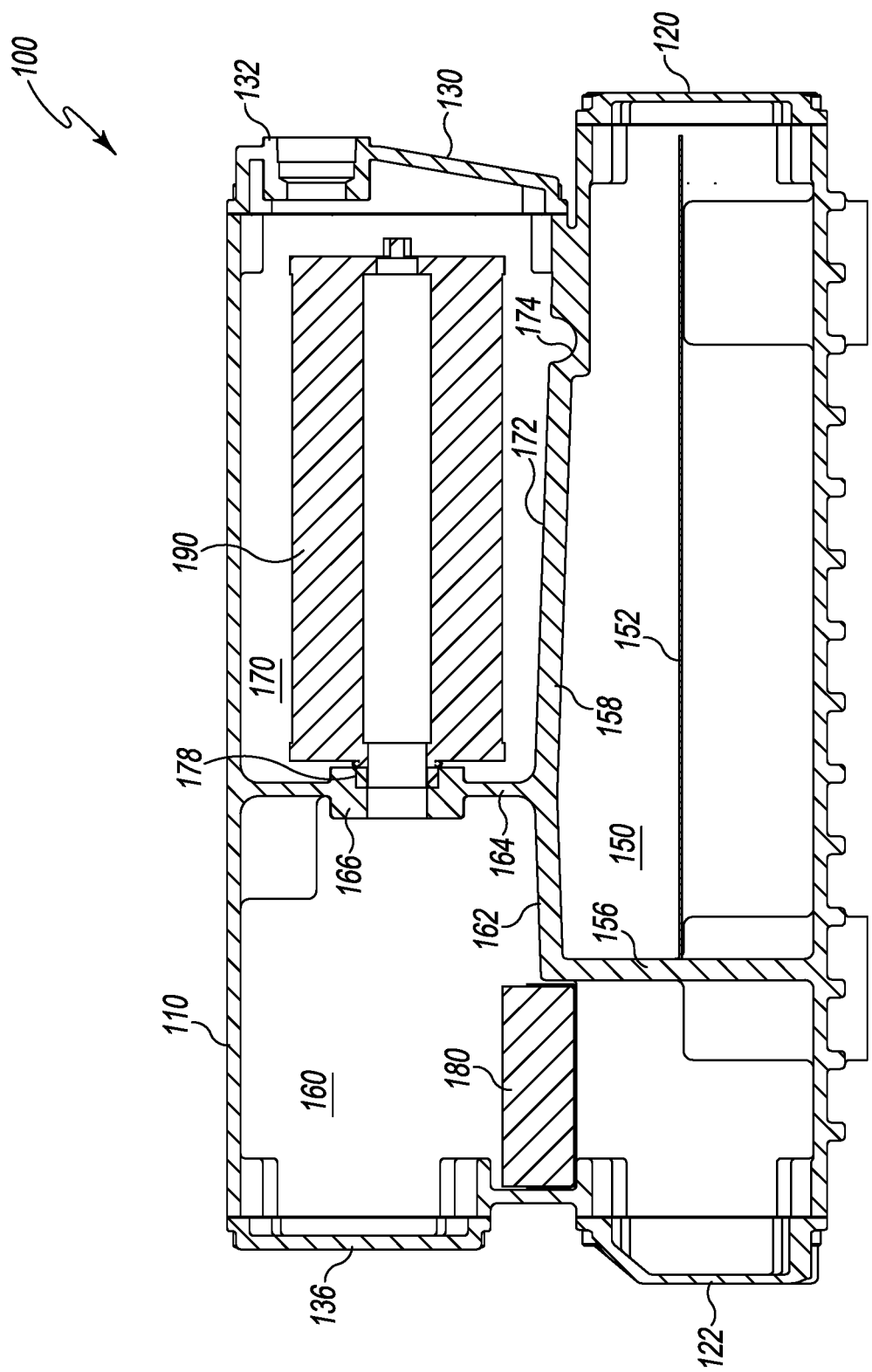
FIG. 7 is a side sectional view of the air/oil separator taken along lines 7-7 of FIG. 3.
Figure 8:
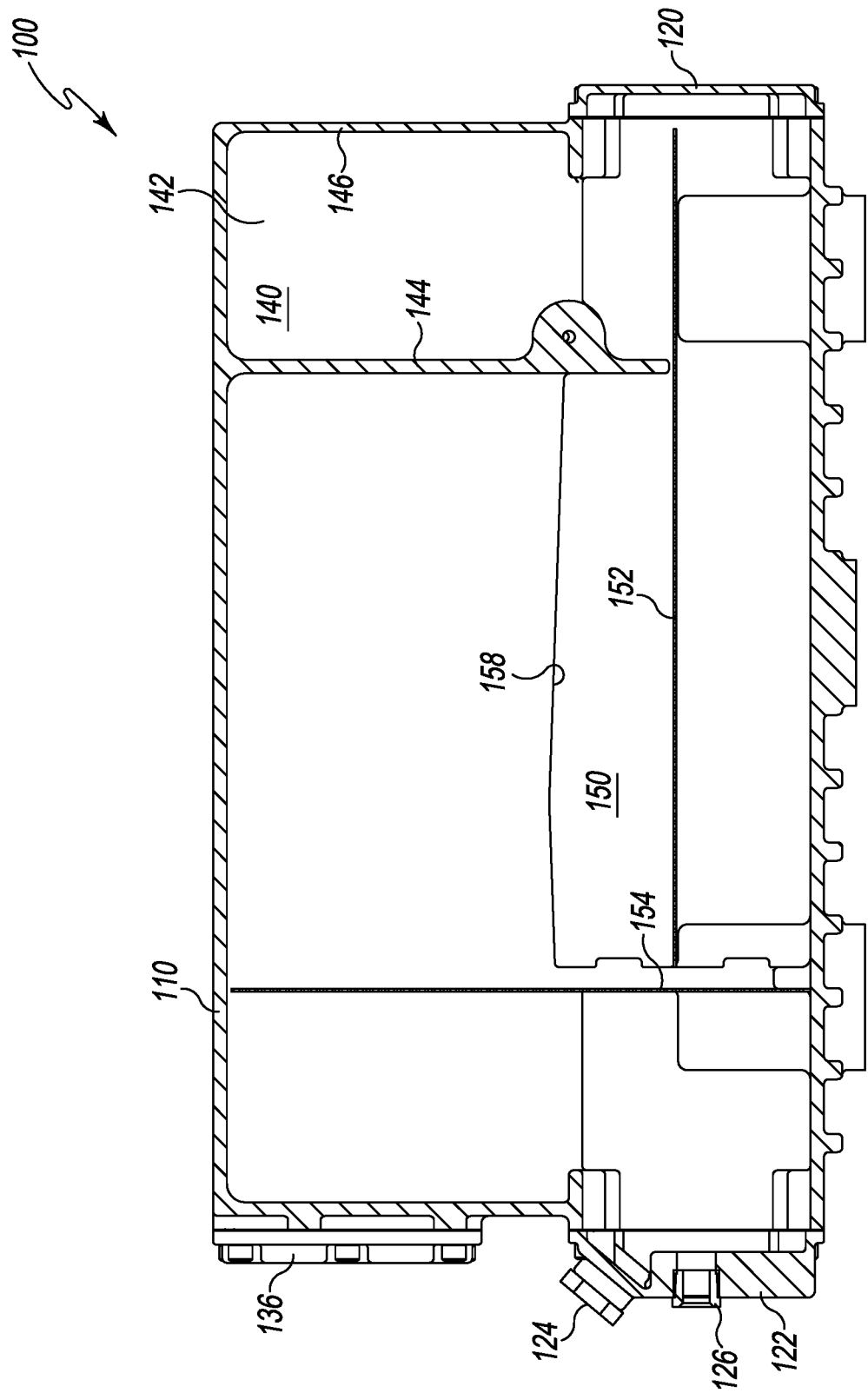
FIG. 8 is a sectioned perspective view of the air/oil separator taken along lines 6-6 of FIG. 3.
Figure 9:
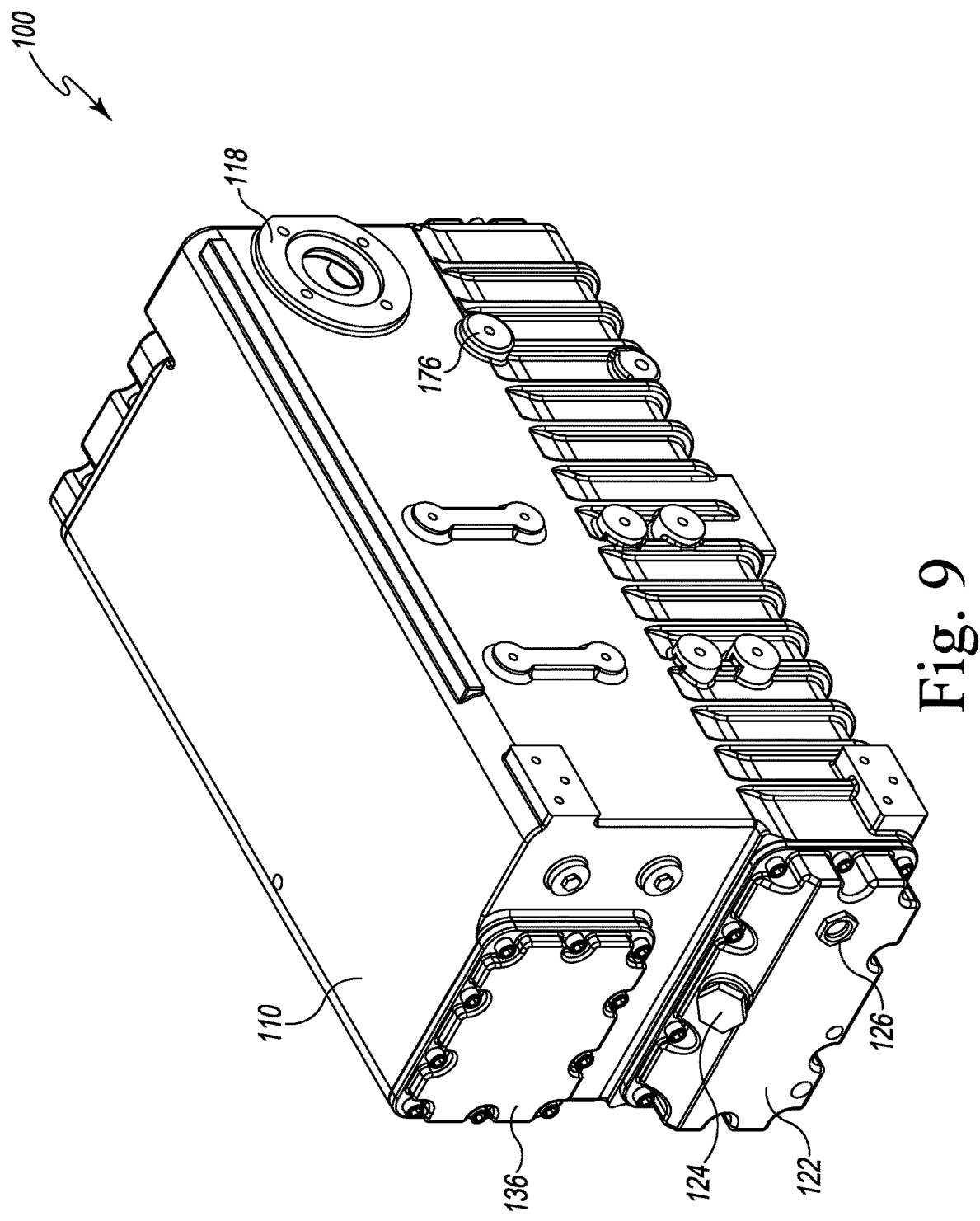
FIG. 9 is a rear perspective view of the air/oil separator of FIG. 1.

As shown, pump 20, motor 30 and heat exchanger 40 are aligned in a row and operatively connected as a single assembly. A base component 90, which also supports the pump/motor/exchanger assembly, is mounted to the side of separator 100 (FIG. 2). Separator 100 employs a side-by-side design, which orients the separator along side of the pump/motor exchanger assembly. Inlet line 50 connects to separator 100 at a side inlet port 118. The side inlet port and the side-by-side orientation design help reduce the overall foot print of the system 10.

Separator 100 has a rectangular metal body or housing 110. Separator housing 110 is or otherwise formed from a suitable metal, such as aluminum to have multiple internal walls and partitions, which form the various internal chambers. In addition, separator housing 110 is cast to have various internal surfaces, channels, bosses, shoulders and flanges that support certain structures or facilitate certain features of the separator, which will be discussed in greater detail hereafter. The ends of housing 110 includes removable covers a forward reservoir cover 120, an aft reservoir cover 122, a filter cover 130 and a screen cover 136. Each cover is affixed to the main body of housing 110 using conventional fasteners, such as hex bolts. Housing 110 has an inlet port 118 formed in one of its exterior sidewalls at the forward end of separator 100. Aft cover 122 has an oil fill port and cap 124 and a return port 126. Oil fill port 124 allows the sealant oil to be manually poured into separator 100 for use in the operation of pump 20. Return port 126 is connected to return line 60. Filter cover 130 has an air exhaust port 132, which vents the air into the atmosphere or into an exhaust system (not shown) after the oil particulate has been recovered. Separator 100 may also include an oil level gauge (not shown), which provides a visual indication of the oil level within separator 100. Separator housing 110 includes a second return "scavenger" port 176 located on the exterior sidewall, which acts as a scavenger port to return collected oil directly to pump 20.

Figure 10:
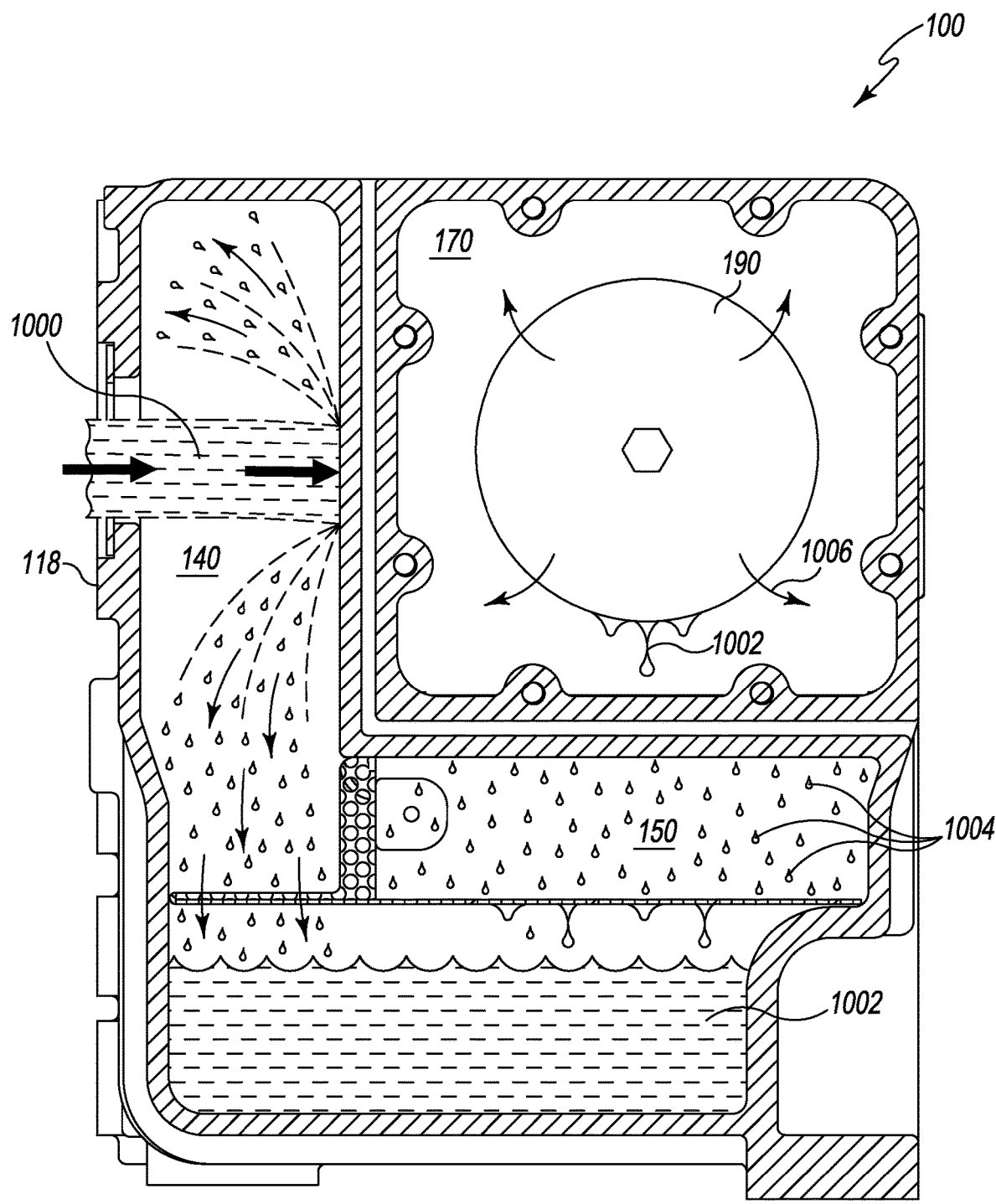
FIG. 10 is another end sectional view of the air/oil separator taken along lines 4-4 of FIG. 3 showing the introduction of discharge oil into the separator.
Figure 11:
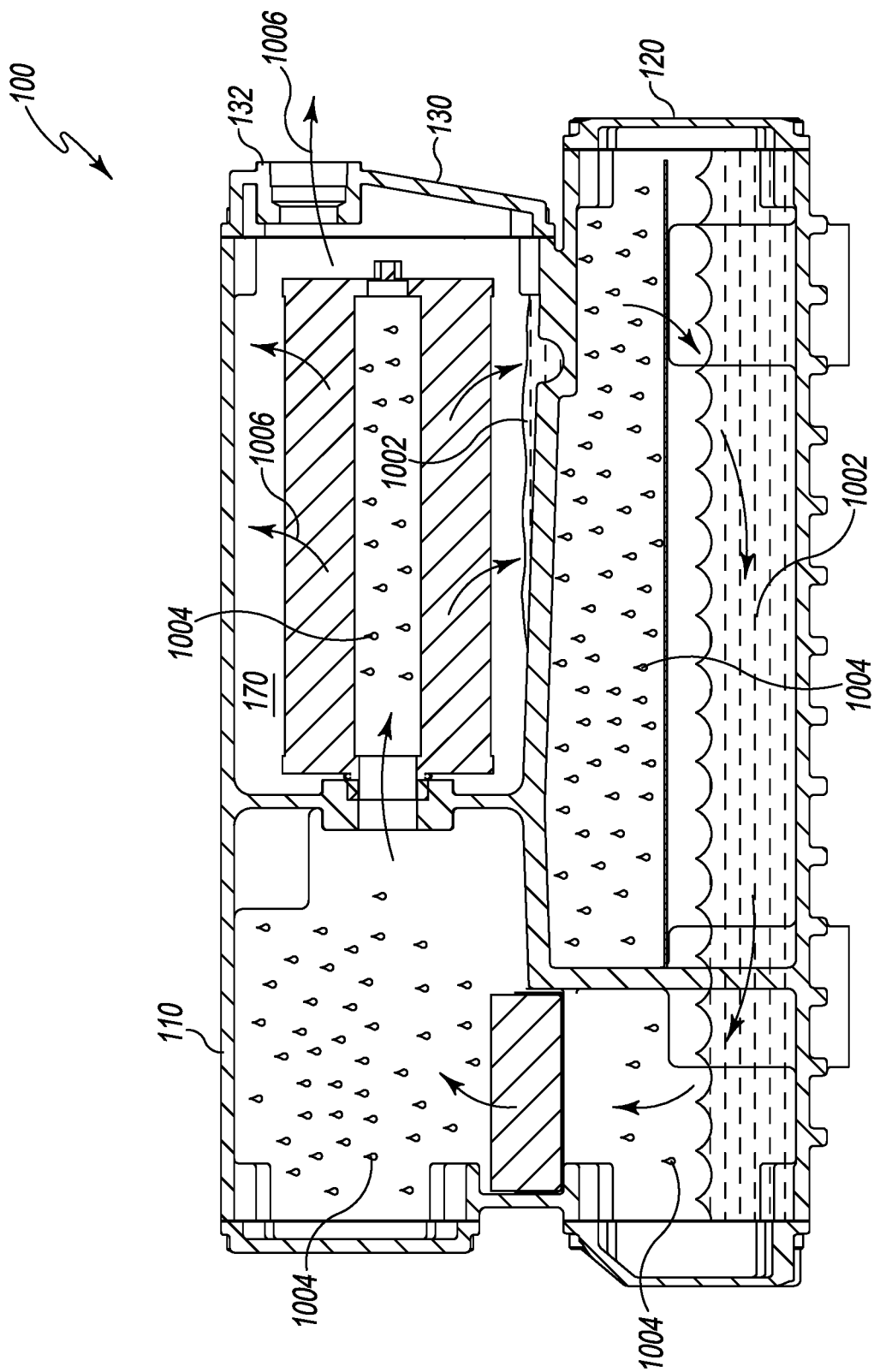
FIG. 11 is another side sectional view of the air/oil separator taken along lines 7-7 of FIG. 3 showing the flow of discharge oil through the separator.

Separator 100 is a multi-chambered reservoir tank, which is divided internally into a deflector chamber 140, a lower reservoir chamber 150, an elevated screen chamber 150 and an elevated filter chamber 160. The discharge oil 1000 from pump 20, which is a combination of liquid oil 1002 and oil mist 1004 passes through the chambers within separator 100 progressively separating and collecting the liquid oil from the discharge (FIGS. 10 and 11).

Figure 12:
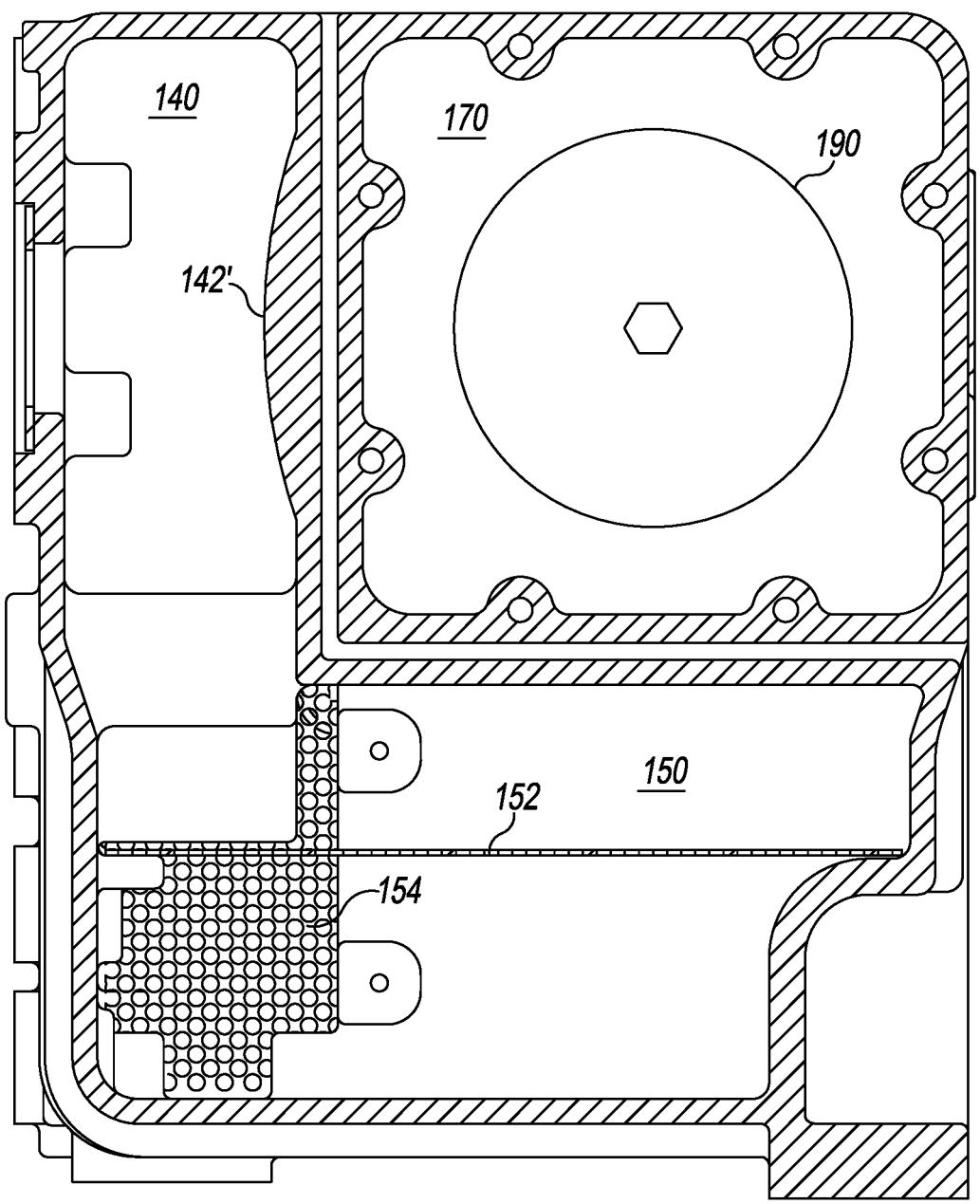
FIG. 12 is an end sectional view of an alternative embodiment of the air/oil separator.

Defector chamber 140 is a small interior space defined by a deflector wall 142, a partition wall 144, end wall 146 and the exterior sidewall of housing 110. Deflector wall 142 is a vertical wall directly opposite inlet port 118. In alternative embodiments, deflector wall 142 may have a convex or concave surface that helps redirect and distribute the flow of discharge oil (FIG. 12).

Reservoir chamber 150 is a large interior space that occupies most of the lower portion of separator housing 110. Main chamber 150 is generally defined by the exterior sidewalls and bottom wall of housing 110, a ceiling wall 158 (which is the bottom wall 172 of filter chamber 160), along with covers 120 and 122. A removable horizontal diffuser plate 152 is suspended within reservoir chamber 150. Diffuser plate 152 is a perforated metal plate, typically stainless steel, which is seated atop internal shoulders formed in the internal walls of housing 110. Diffuser plate 152 is positioned within main chamber 150 to seat just above the discharge oil inside main chamber 150. The perforations in diffuser plate 152 allows oil particulate to settle through the plate and collect at the bottom of main chamber 150. Diffuser plate 152 also help isolate the oil mist from liquid discharge oil at the bottom of main chamber 150. Main chamber 150 is partially divided by an interior wall 156 and a second vertical L-shaped diffuser plate 154. Diffuser plate 154 is also a perforated metal plate, removably seated adjacent interior wall 156, which separates chamber 150 into a large forward section and smaller aft section. It should be noted that the aft portion of reservoir chamber 150 is approximately one third to one quarter smaller than the forward portion of the reservoir chamber.

The aft section of reservoir chamber 150 opens into screen chamber 160, which is positioned over of the aft end of reservoir chamber 150. Screen chamber 160 is defined by the exterior top and sidewalls of housing 110 and interior bottom wall 162 and end wall 164, along with screen cover 136. End wall 164 has through port opening 166 into filter chamber 170. Separator 100 includes a removable oil screen 180 that separates reservoir chamber 160 from the upper screen chamber 160. Oil screen 180 is a rectangular fibrous pad of stainless steel wire that is supported on internal shoulders formed in the interior walls of separator housing 110.

Filter chamber 170 is located over the forward portion of reservoir chamber 150 and is generally defined by the exterior sidewalls and top wall of housing 110, a bottom wall 172, end wall 164 and filter cover 130. The interior surface of bottom wall 172 has a sloped draft that converges in a recessed channel 174 that opens into scavenger port 176 in the exterior sidewall connected to scavenger line 70. Separator 100 supports a replaceable internal air filter 190 within filter chamber 170. Filter 190 is of conventional design and may be of the any suitable type commercially available. Typically, filter 190 contains an oil absorbing composite mesh, which attracts and coalesces oil particulate from the oil mist. Filter 190 is detachably mounted to fitting 178 in through port 166 of end wall 164. Filter 190 is accessible through the opening in housing 110 when filter cover 130 is removed.

FIGS. 10 and 11 illustrate the operation of separator 10 and various stages of oil particulate separation. Oil discharge 1000 from pump 20 flows into separator 10 through inlet port 118. Oil discharge 1000 from pump 20 is heated and includes both liquid oil 1002 and oil mist 1004, which is a gaseous mixture of air and oil particulate. Oil discharge 1000 from pump 20 enters separator 100 through inlet port 118 into deflector chamber 140 (FIG. 10). Discharge oil 1000 enters deflector chamber 140 under pressure and impacts against deflector wall 142 redirecting the flow of discharge oil radially before falling vertically into main reservoir chamber 150 below. Redirecting flow of oil discharge 1000 within the deflector chambers 140 slows and cools the discharge oil, which helps minimize oil mist. Liquid oil 1002 settles across the bottom of reservoir chamber 150, while the oil mist 1004 expands through and above diffuser plate 152 across the top of the reservoir chamber (FIG. 11). Liquid oil 1002 collected at the bottom of reservoir chamber 150 is reintroduced into the oil seal system 10 through a return line (not shown) connected to return port 126. Generally, the oil level of the liquid oil 1002 contained in reservoir chamber 150 is below diffuser plate 152.

Diffuser plate 152 provides a structural mechanism, which restricts and slows the flow of oil mist 1004 vertically within reservoir chamber 150. Diffuser plate 152 also serves as a structure upon which oil particulate may Coalesce and collect. As oil mist 1004 passes through diffuser plate 152, a portion of gaseous oil particles Coalesces on the plate, which eventually drips through the perforated openings collecting at the bottom of reservoir chamber 150. The liquid oil 1002 collected at the bottom of reservoir chamber 150 is used to resupply pump 20. Liquid oil 1002 is drawn through outlet port 126 to heat exchanger 40 and then back to pump 20. The continuous flow of discharge oil 1000 from pump 20 into separator 100 causes liquid oil 1002 and oil mist 1004 to flow around partition wall 156 and through diffuser plate 154 from the forward portion to the aft portion of reservoir chamber 150. Flowing around interior wall 156 and through diffuser plate 154 further slows the discharge oil and oil mist through separator 100. Diffuser plate 154 also serves as a structure upon which oil particulate coalesces and collects.

Oil mist 1004 vents upward from the aft portion of reservoir chamber 150 through oil screen 180 into screen chamber 160. Oil screen 180 prevents liquid oil 1002 from splashing upward into screen chamber 160 while allowing oil mist 1004 to rise through the screen from lower accumulation chamber 150 into screen chamber 160. Oil particulate is captured within oil screen 180 further removing oil particulate from oil mist 1004 before entering screen chamber 160. Again, liquid oil 1002 drips back into the aft portion of reservoir chamber 150 from oil screen 180 providing another mechanical air/oil separation structure within separator 100. Oil mist 1004 is drawn form screen chamber 160 into filter chamber 170 through filter port 166 and filter 180. Filter 190 removes remaining oil particulate contained in oil mist 1004 before clean air 1006 is exhausted out exhaust port 132. Any liquid oil 1002 dripping from filter 190 within filter chamber 170 runs into channel 174 and returns to pump 20 through scavenger port 176.

One skilled in the art will recognize several advantages that the design and operation of the separator has over conventional air/oil separators. The multi-chambered design of the separator creates multiple stages of oil separation within the separator. The multiple stages of separation in addition to the use of the oil screen and filter significantly improves the oil separation over conventional separators.

The first separation stage occurs when the heated oil discharge enters and is redirected off the deflector wall within the relatively small confines of the deflector chamber. Directing the discharge oil against the deflector wall abruptly decelerates the fluid flow. The oil mist generated by the discharge oil impacting the deflector wall is confined within the deflector chamber with the liquid oil falling vertically into the main reservoir chamber. Consequently, the deflector chamber uses gravity to help separate the denser liquid oil from the gaseous oil mist.

The second separation stage is produced by two perforated diffuser plates. Oil mist passes through the perforated diffuser plates inside the reservoir chamber. The diffuser plates restrict and slow the flow of oil mist through the reservoir chamber. Slowing the flow of oil mist permits more oil particulate to coalesce before venting upward from the inner reservoir chamber into the screen chamber. Restricting the flow of mist creates turbulence that further enhances separatation of the oil particulate. In addition, the diffuser plates provide a metal surface upon which gaseous oil particulate can coalesce and collect.

The third stage of particulate separation is created by venting the oil mist through the oil screen from the reservoir chamber into the screen chamber. The fibrous wire oil screen provides another large metal surface upon which gaseous oil particulate can coalesce and collect. In addition, the oil screen impedes the movement of heavier oil particulate upward against the force of gravity into the screen chamber.

The fourth separation stage comes in the form of the conventional filter element contained in the filter chamber. The remaining oil particles coalesce on the fibers of the filter element and are collected for introduction to the oil seal system.

It should also be noted that the separator also uses gravity and multiple direction changes of fluid flow through the various internal chambers of the separator to slow the flow rate of the liquid oil and oil mist, which all contributes to improved oil separation. The oil discharge travels the entire length of the separator and back before venting air fully separated from the discharge oil. Locating the screen chamber and filter chamber over the main reservoir chamber allows gravity to help separate oil particulate from the oil mist. In addition, the position of the screen and filter chambers over the reservoir chamber along with the side oriented inlet port provides a small compact footprint for the entire oil seal system.

It should be apparent from the foregoing that an invention having significant advantages has been provided. While the invention is shown in only a few of its forms, it is not just limited but is susceptible to various changes and modifications without departing from the spirit thereof. The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

I claim:

1. An air/oil separator used as part of a closed loop oil seal system for a vacuum pump, which separates and collects oil particulate from the oil discharge, generated by the operation of the vacuum pump, where the oil discharge includes liquid oil and gaseous oil mist, the separator comprising:
   a multi-chambered separator housing having an interior thereof for receiving the oil discharge from the pump and accumulating liquid oil separated from the oil discharge,
   the housing interior divided internally into an elongated reservoir chamber having a forward portion and an aft portion thereof, a deflector chamber spaced above the forward portion of the reservoir chamber and in open communication with the reservoir chamber, a screen chamber spaced above the aft portion of the reservoir chamber in open communication with the reservoir chamber, and a filter chamber spaced above the forward portion of the reservoir chamber in open communication with the screen chamber,
   the separator housing includes a side oriented inlet port opening into the deflector chamber,
   the deflector chamber defined in part by a vertical deflector wall spaced horizontally opposite the side oriented inlet port for redirecting oil discharge radially before falling into the reservoir chamber.

2. The separator of claim 1 and a screen disposed between the reservoir chamber and the screen chamber.

3. The separator of claim 2 wherein the screen element constitutes a structure upon which oil particulate may coalesce to facilitate oil separation before oil mist enters the screen chamber.

4. The separator of claim 1 and further comprising a filter element disposed within the filter chamber for removing the remaining portion of the oil particulate from the oil mist passed through the filter chamber.

5. The separator of claim 1 and further comprising a first diffuser plate suspended horizontally within the reservoir chamber for restricting and slowing the flow of oil mist through the reservoir chamber and a second diffuser plate suspended vertically within the reservoir chamber for restricting and slowing the flow of liquid oil and oil mist from the forward portion of the reservoir chamber to the aft portion of the reservoir chamber.

6. The separator of claim 5 wherein the first diffuser plate and second diffuser plate are removably mounted to the separator housing within the reservoir chamber.

7. The separator of claim 5 wherein the first diffuser plate and second diffuser plate constitute a structure upon which oil particulate may coalesce to facilitate oil separation within the reservoir chamber.

8. The separator of claim 1 wherein the separator housing includes a first cover plate enclosing the forward portion of the reservoir chamber and a second cover plate enclosing the aft portion of the reservoir chamber.

9. The separator of claim 8 wherein the second cover plate includes a return port for returning liquid oil collected in the separator to circulation in the oil seal system.

10. The separator of claim 1 wherein the separator housing includes a return port for returning liquid oil collected in the separator to circulation in the oil seal system in communication with the reservoir chamber.

11. The separator of claim 1 wherein the deflector wall has a planar surface facing the inlet port.

12. The separator of claim 1 wherein the deflector wall has a convex surface facing the inlet port.

13. An air/oil separator used as part of a closed loop oil seal system for a vacuum pump, which separates and collects oil particulate from the oil discharge, generated by the operation of the vacuum pump, where the oil discharge includes liquid oil and gaseous oil mist, the separator comprising:
   a multi-chambered separator housing having an interior thereof for receiving the oil discharge from the pump and accumulating liquid oil separated from the oil discharge,
   the housing interior divided internally into an elongated reservoir chamber having a forward portion and an aft portion thereof, a deflector chamber spaced above the forward portion of the reservoir chamber and in open communication with the reservoir chamber, a screen chamber spaced above the aft portion of the reservoir chamber in open communication with the reservoir chamber, and a filter chamber spaced above the forward portion of the reservoir chamber in open communication with the screen chamber,
   the separator housing includes a side oriented inlet port opening into the deflector chamber, a screen disposed between the reservoir chamber and the screen chamber, a filter element disposed within the filter chamber for removing the remaining portion of the oil particulate from the oil mist passed through the filter chamber, a first removable diffuser plate suspended horizontally within the reservoir chamber for restricting and slowing the flow of oil mist through the reservoir chamber, and a second removable diffuser plate suspended vertically within the reservoir chamber for restricting and slowing the flow of liquid oil and oil mist from the forward portion of the reservoir chamber to the aft portion of the reservoir chamber, the deflector chamber defined in part by a deflector wall spaced opposite the side oriented inlet port for redirecting oil discharge radially before falling into the reservoir chamber.

14. The separator of claim 13 wherein the separator housing also includes a first cover plate enclosing the forward portion of the reservoir chamber and a second cover plate enclosing the aft portion of the reservoir chamber, the second cover plate includes a return port for returning liquid oil collected in the separator to circulation in the oil seal system.

15. An air/oil separator used as part of a closed loop oil seal system for a vacuum pump, which separates and collects oil particulate from the oil discharge, generated by the operation of the vacuum pump, where the oil discharge includes liquid oil and gaseous oil mist, the separator comprising:

a multi-chambered separator housing having an interior thereof for receiving the oil discharge from the pump and accumulating liquid oil separated from the oil discharge, the housing interior divided internally into an elongated reservoir chamber having a forward portion and an aft portion thereof, a deflector chamber spaced above the forward portion of the reservoir chamber and in open communication with the reservoir chamber, a screen chamber spaced above the aft portion of the reservoir chamber in open communication with the reservoir chamber, and a filter chamber spaced above the forward portion of the reservoir chamber in open communication with the screen chamber, the separator housing includes a side oriented inlet port opening into the deflector chamber, the deflector chamber defined in part by a deflector wall spaced opposite the side oriented inlet port for redirecting oil discharge radially before falling into the reservoir chamber, and a first diffuser plate suspended horizontally within the reservoir chamber for restricting and slowing the flow of oil mist through the reservoir chamber and a second diffuser plate suspended vertically within the reservoir chamber for restricting and slowing the flow of liquid oil and oil mist from the forward portion of the reservoir chamber to the aft portion of the reservoir chamber.

16. The separator of claim 15 and a screen disposed between the reservoir chamber and the screen chamber.

17. The separator of claim 16 wherein the screen element constitutes a structure upon which oil particulate may coalesce to facilitate oil separation before oil mist enters the screen chamber.

18. The separator of claim 15 and further comprising a filter element disposed within the filter chamber for removing the remaining portion of the oil particulate from the oil mist passed through the filter chamber.

19. The separator of claim 15 wherein the first diffuser plate and second diffuser plate are removably mounted to the separator housing within the reservoir chamber.

20. The separator of claim 15 wherein the first diffuser plate and second diffuser plate constitute a structure upon which oil particulate may coalesce to facilitate oil separation within the reservoir chamber.

21. The separator of claim 15 wherein the separator housing includes a first cover plate enclosing the forward portion of the reservoir chamber and a second cover plate enclosing the aft portion of the reservoir chamber.

22. The separator of claim 21 wherein the second cover plate includes a return port for returning liquid oil collected in the separator to circulation in the oil seal system.

23. The separator of claim 15 wherein the separator housing includes a return port for returning liquid oil collected in the separator to circulation in the oil seal system in communication with the reservoir chamber.

24. The separator of claim 15 wherein the deflector wall has a planar surface facing the inlet port.

25. The separator of claim 15 wherein the deflector wall has a convex surface facing the inlet port.

* * * * *